United States Patent
Choi et al.

(10) Patent No.: US 7,483,579 B2
(45) Date of Patent: *Jan. 27, 2009

(54) METHOD AND APPARATUS FOR ENCODING AND DECODING MOTION VECTORS

(75) Inventors: Woong-il Choi, Namyangju-si (KR); Byeung-woo Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/773,217

(22) Filed: Jul. 3, 2007

(65) Prior Publication Data

US 2007/0286506 A1    Dec. 13, 2007

Related U.S. Application Data

(63) Continuation of application No. 10/619,615, filed on Jul. 16, 2003, now Pat. No. 7,257,263.

(30) Foreign Application Priority Data

Jul. 16, 2002    (KR) .............................. 2002-41798

(51) Int. Cl.
G06K 9/36    (2006.01)
G06K 9/46    (2006.01)

(52) U.S. Cl. ..................................... 382/233

(58) Field of Classification Search ................ 382/103, 382/232–238, 244–247; 375/240.12, 240.16, 375/240.24, 240.25; 348/400.1–421.1
See application file for complete search history.

(56) References Cited

U.S. PATENT DOCUMENTS

| 5,825,930 | A | 10/1998 | Park et al. |
|---|---|---|---|
| 6,023,298 | A | 2/2000 | Hwang |
| 6,625,214 | B1 | 9/2003 | Umehara et al. |
| 6,925,123 | B2 | 8/2005 | Subramaniyan et al. |
| 7,257,263 | B2 * | 8/2007 | Choi et al. ................. 382/238 |

OTHER PUBLICATIONS

"Text of Committee Draft of Joint Video Specification (ITU-T REC. H-264 ISO/IEC 14496-10 AVC) MPEG02/N4810", ISO/IEC JTC1/SC29/WG11 MPEG02/N4810, Fairfax, US, May 2002, pp. 1-X, 1, XPO01074690.

(Continued)

*Primary Examiner*—Sherali Ishrat
(74) *Attorney, Agent, or Firm*—Sughrue Mion, PLLC

(57) ABSTRACT

There is provided a method and apparatus for encoding and decoding motion vectors. Motion vectors are encoded through the steps of: (a) predicting motion vectors of a type identical to that of a present block and obtaining predictive motion vectors with respect to neighbor blocks having motion vectors of a type different from that of the present block among a plurality of neighbor blocks adjacent to the present block; (b) calculating a representative value of the motion vectors of the type identical to that of the present block from the motion vectors of the neighbor blocks and the predictive motion vectors; (c) calculating a difference value between the calculated representative value and the motion vector of the present block; and (d) encoding the calculated difference value. The motion vectors can be more efficiently encoded even when they refer to different reference pictures.

3 Claims, 6 Drawing Sheets

OTHER PUBLICATIONS

"Working Draft No. 2, Revision 2 (WD-2)". Document JVT-B118R2, Jan. 29. 2002, pp. 1-10, XP001086630.

Fukunaga S et al: "MEPG-4 Video Verification Model Version 16.0" International Organazation for Standardization-Organisation Internationale De Normalisation, vol. N3312, Mar. 2000, pp. 1-380, XPO00861688.

"Recommendation H. 263: Video coding for low bit rate communication" ITU-T Draft Recommendation H.263. Feb. 1998, pp. 1-167, XP002176560.

Wiegand T et al: "Block-Based Hybrid Video Coding Using Motion-Compensated Long-Term Memory Prediction", ITG Fachberichte, VDE Verlag, Berlin, DE, No. 143, 1997, pp. 153-158, XP000924838.

* cited by examiner

METHOD AND APPARATUS FOR ENCODING AND DECODING MOTION VECTORS

This is a continuation of application Ser. No. 10/619,615 filed Jul. 16, 2003 now issued as U.S. Pat. No. 7,257,263. The entire disclosure of the prior application, application Ser. No. 10/619,615 is hereby incorporated by reference.

BACKGROUND OF THE INVENTION

This application claims the priority of Korean Patent Application No. 2002-41798, filed Jul. 16, 2002 in the Korean Intellectual Property Office, the disclosure of which is incorporated herein in its entirety by reference.

1 Field of the Invention

The present invention relates to a method and apparatus for encoding and decoding motion vectors. More specifically, the present invention relates to a method and apparatus for encoding and decoding motion vectors calculated with reference to a plurality of pictures.

2 Description of the Related Art

According to MPEG-1 or MPEG-2 coding standards, P-picture coding that refers to a previous picture or B-picture coding that refers to both previous and following pictures is adapted to encode a present picture, and motion compensation is carried out on the basis of the coding type. Further, in order to improve coding efficiency, prediction coding is carried out using motion vectors of neighbor blocks so that the relationship between the motion vectors of the neighbor blocks can be reflected, rather than directly coding the motion vector of the present block itself.

Occasionally, the motion vectors of the neighbor blocks used in the prediction coding may not refer to the same reference picture as that which refers to the motion vector of the present block. If such an occasion arises, it is conventional to exclude the motion vectors of the neighbor blocks referring to a different reference picture from the prediction coding process, because the coding efficiency can be lowered in the event that the motion vectors obtained on the basis of the different reference picture are use in the prediction coding. However, in the case of excluding the motion vectors of the neighbor blocks referring to the different reference picture from the prediction coding process, the relationship between the motion vectors of the neighbor blocks is not sufficiently reflected and, therefore, the coding efficiency of the motion vectors can be correspondingly lowered. The problem is much more serious in the case of pictures including more such blocks that refer to different reference pictures.

SUMMARY OF THE INVENTION

The present invention provides a method and apparatus for encoding and decoding motion vectors, in which prediction coding can be much more efficiently carried out even when the motion vectors refer to different reference pictures.

Another object of the present invention is to provide a method and apparatus for encoding and decoding motion vectors, in which coding efficiency can be improved by adjusting at least some motion vectors referring to different reference pictures.

A method for encoding motion vectors according to the present invention comprises: (a) predicting a motion vector of a type identical to that of a present block and obtaining a predictive motion vector with respect to neighbor blocks having motion vectors of a type different from that of the present block among a plurality of neighbor blocks adjacent to the present block; (b) calculating a representative value of the motion vectors of the type identical to that of the present block from the motion vectors of the neighbor blocks and the predictive motion vector; (c) calculating a difference value between the calculated representative value and the motion vector of the present block; and (d) encoding the calculated difference value.

An apparatus for encoding motion vectors according to the present invention comprises a motion vector predictor for predicting a motion vector of a type identical to that of a present block and producing a predictive motion vector with respect to neighbor blocks having motion vectors of a type different from that of the present block among a plurality of neighbor blocks adjacent to the present block, and for calculating a representative value of the motion vectors of the type identical to that of the present block from the motion vectors of the neighbor blocks and the predictive motion vector and calculating a difference value between the calculated representative value and the motion vector of the present block; and a motion vector encoder for encoding the calculated difference value.

According to the present invention, it is preferable that the motion vector predictor calculates a predictive forward motion vector MVf(predictive) as the predictive motion vector, when the motion vector of the present block is a forward motion vector MVf and the motion vector of the neighbor block is a backward motion vector MVb, according to the following equation:

$$MVf(\text{predictive}) = \frac{d1}{d2 - d1} \times MVb$$

where d1 is a distance between a present picture to which the neighbor block belongs and a previous picture to which the neighbor block refers, and d2 is a distance between a following picture to which the neighbor block refers and the previous picture to which the neighbor block refers.

According to the present invention, it is preferable that the motion vector predictor calculates a predictive backward motion vector MVb(predictive) as the predictive motion vector, when the motion vector of the present block is a backward motion vector MVb and the motion vector of a neighbor block is a forward motion vector MVf, according to the following equation:

$$MVb(\text{predictive}) = \frac{d2 - d1}{d1} \times MVf$$

where d1 is a distance between a present picture to which the neighbor block belongs and a previous picture to which the neighbor block refers, and d2 is a distance between a following picture to which the neighbor block refers and the previous picture to which the neighbor block refers.

Further, according to the present invention, it is preferable that the motion vector predictor calculates a predictive value PMV_X as the representative value according to the following equation:

PMV_X=median(MVf_A, MVf_B, MVf_C) or median(MVb_A, MVb_B, MVb_C)

where MVf_A, MVf_B, MVf_C, MVb_A, MVb_B, and MVb_C are components of motion vectors of neighbor blocks in which MVf_A is a forward motion vector of a left block, MVf_B is a forward motion vector of an upper block, MVf_C is a forward motion vector of an upper-right block, MVb_A is a backward motion vector of a left block, MVb_B is a backward motion vector of an upper block, and MVb_C is a backward motion vector of an upper-right block, one of which can be the predictive motion vector.

Meanwhile, a method for decoding motion vectors according to the present invention comprises: (a) predicting a motion vector of a type identical to that of a present block and obtaining a predictive motion vector with respect to neighbor blocks having motion vectors of a type different from that of the present block among a plurality of neighbor blocks adjacent to the present block; (b) calculating a representative value of the motion vectors of the type identical to that of the present block from the motion vectors of the neighbor blocks and the predictive motion vector; and (c) calculating the motion vector of the present block by adding the calculated representative value and a decoded difference value.

According to the present invention, it is preferable that a predictive forward motion vector MVf(predictive) is calculated as the predictive motion vector, when the motion vector of the present block is a forward motion vector MVf and the motion vector of the neighbor block is a backward motion vector MVb, according to the following equation:

$$MVf(\text{predictive}) = \frac{t1}{t2 - t1} \times MVb$$

where t1 is a time difference between a present picture to which the neighbor block belongs and a previous picture to which the neighbor block refers, and t2 is a time difference between a following picture to which the neighbor block refers and the previous picture to which the neighbor block refers.

According to the present invention, it is preferable that a predictive backward motion vector MVb(predictive) is calculated as the predictive motion vector, when the motion vector of the present block is a backward motion vector MVb and the motion vector of a neighbor block is a forward motion vector MVf, according to the following equation:

$$MVb(\text{predictive}) = \frac{t2 - t1}{t1} \times MVf$$

where t1 is a time difference between a present picture to which the neighbor block belongs and a previous picture to which the neighbor block refers, and t2 is a time difference between a following picture to which the neighbor block refers and the previous picture to which the neighbor block refers.

According to the present invention, it is preferable that a predictive forward motion vector MVf(predictive) is calculated as the predictive motion vector, when the motion vector of the present block is a forward motion vector MVf and the motion vector of the neighbor block is a backward motion vector MVb, according to the following equation:

$$MVf(\text{predictive}) = \frac{d1}{d2 - d1} \times MVb$$

where d1 is a distance between a present picture to which the neighbor block belongs and a previous picture to which the neighbor block refers, and d2 is a distance between a following picture to which the neighbor block refers and the previous picture to which the neighbor block refers.

According to the present invention, it is preferable that a predictive backward motion vector MVb(predictive) is calculated as the predictive motion vector, when the motion vector of the present block is a backward motion vector MVb and the motion vector of a neighbor block is a forward motion vector MVf, according to the following equation:

$$MVb(\text{predictive}) = \frac{d2 - d1}{d1} \times MVf$$

where d1 is a distance between a present picture to which the neighbor block belongs and a previous picture to which the neighbor block refers, and d2 is a distance between a following picture to which the neighbor block refers and the previous picture to which the neighbor block refers.

Further, according to the present invention, it is preferable that the step (b) of the decoding method includes the step of calculating a predictive value PMV_X for decoding as the representative value according to the following equation:

$$PMV\_X = \text{median}(MVf\_A, MVf\_B, MVf\_C) \text{ or } \text{median}(MVb\_A, MVb\_B, MVb\_C)$$

where MVf_A, MVf_B, MVf_C, MVb_A, MVb_B, and MVb_C are components of motion vectors of neighbor blocks in which MVf_A is a forward motion vector of a left block, MVf_B is a forward motion vector of an upper block, MVf_C is a forward motion vector of an upper-right block, MVb_A is a backward motion vector of a left block, MVb_B is a backward motion vector of an upper block, and MVb_C is a backward motion vector of an upper-right block, and one of these vectors can be the predictive motion vector.

Meanwhile, an apparatus for decoding motion vectors according to the present invention comprises a motion vector decoder for decoding a difference value; and a motion vector prediction compensator which predicts a motion vector of a type identical to that of a present block and obtaining a predictive motion vector with respect to neighbor blocks having motion vectors of a type different from that of the present block among a plurality of neighbor blocks adjacent to the present block, calculates a representative value of the motion vectors of the type identical to that of the present block from the motion vectors of the neighbor blocks and the predictive motion vector and calculates the motion vector of the present block by adding the calculated representative value and a decoded difference value.

According to the present invention, it is preferable that the motion vector prediction compensator calculates a predictive forward motion vector MVf(predictive) as the predictive motion vector, when the motion vector of the present block is a forward motion vector MVf and the motion vector of the neighbor block is a backward motion vector MVb, according to the following equation:

$$MVf(\text{predictive}) = \frac{t1}{t2 - t1} \times MVb$$

where t1 is a time difference between a present picture to which the neighbor block belongs and a previous picture to which the neighbor block refers, and t2 is a time difference between a following picture to which the neighbor block refers and the previous picture to which the neighbor block refers.

According to the present invention, it is preferable that the motion vector prediction compensator calculates a predictive backward motion vector MVb(predictive) as the predictive motion vector, when the motion vector of the present block is a backward motion vector MVb and the motion vector of a neighbor block is a forward motion vector MVf, according to the following equation:

$$MVb(\text{predictive}) = \frac{t2 - t1}{t1} \times MVf$$

where t1 is a time difference between a present picture to which the neighbor block belongs and a previous picture to which the neighbor block refers, and t2 is a time difference between a following picture to which the neighbor block refers and the previous picture to which the neighbor block refers.

According to the present invention, it is preferable that the motion vector prediction compensator calculates a predictive forward motion vector MVf(predictive) as the predictive motion vector, when the motion vector of the present block is a forward motion vector MVf and the motion vector of the neighbor block is a backward motion vector MVb, according to the following equation:

$$MVf(\text{predictive}) = \frac{d1}{d2 - d1} \times MVb$$

where d1 is a distance between a present picture to which the neighbor block belongs and a previous picture to which the neighbor block refers, and d2 is a distance between a following picture to which the neighbor block refers and the previous picture to which the neighbor block refers.

According to the present invention, it is preferable that the motion vector prediction compensator calculates a predictive backward motion vector MVb(predictive) as the predictive motion vector, when the motion vector of the present block is a backward motion vector MVb and the motion vector of a neighbor block is a forward motion vector MVf, according to the following equation:

$$MVb(\text{predictive}) = \frac{d2 - d1}{d1} \times MVf$$

where d1 is a distance between a present picture to which the neighbor block belongs and a previous picture to which the neighbor block refers, and d2 is a distance between a following picture to which the neighbor block refers and the previous picture to which the neighbor block refers.

Moreover, the objects of the present invention can be achieved by a computer readable information recording medium on which program codes for implementing the above described encoding or decoding method are recorded.

BRIEF DESCRIPTION OF THE DRAWINGS

The above and other aspects and advantages of the present invention will become more apparent by describing, in detail, preferred embodiments thereof with reference to the attached drawings in which.

DETAILED DESCRIPTION OF THE INVENTION

Figure 1:
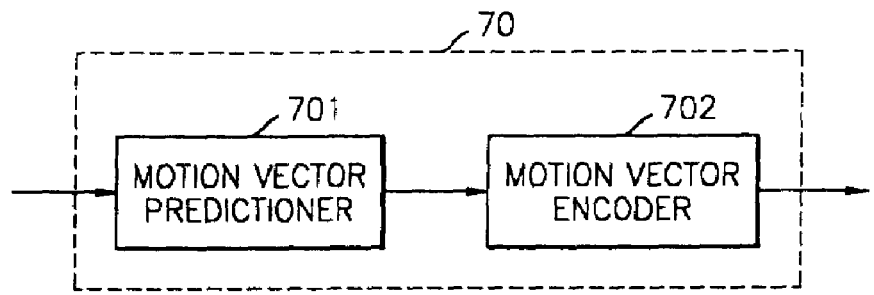
FIG. 1 is a block diagram of a motion vector encoding apparatus according to a preferred embodiment of the present invention.

An apparatus for encoding motion vectors according to a preferred embodiment of the present invention is shown in FIG. 1 as a block diagram. Referring to FIG. 1, an encoding apparatus 70 for encoding motion vectors comprises a motion vector predictor 701 and a motion vector encoder 702. When motion vectors of a plurality of blocks are received, the motion vector predictor 701 estimates motion vectors of a type identical to that of a present block and produces predictive motion vectors with respect to neighbor blocks having motion vectors of a type different from that of the present block among a plurality of neighbor blocks adjacent to the present block, and calculates a representative value of the motion vectors of the type identical to that of the present block from the motion vectors of the neighbor blocks and the predictive motion vectors and, then, calculates a difference value between the calculated representative value and the motion vector of the present block. The motion vector encoder 702 encodes the difference value provided from the motion vector predictor 701. In a preferred embodiment of the present invention, the motion vector encoder 702 encodes a differential value as the difference value.

Figure 2:
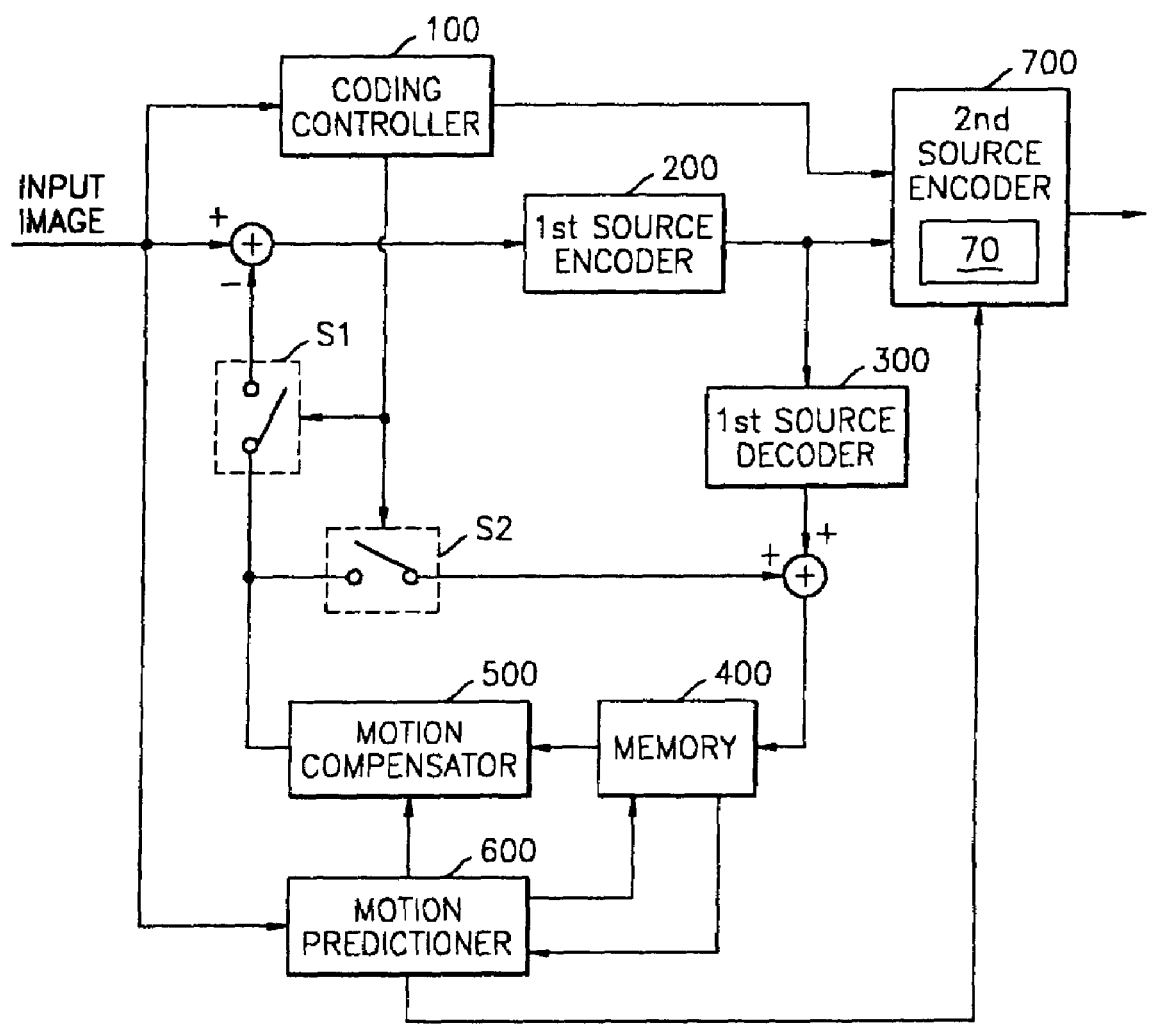
FIG. 2 is a block diagram of an image data coding apparatus including the motion vector encoding apparatus shown in FIG. 1 according to a preferred embodiment of the present invention.

FIG. 2 is a block diagram of an image data coding apparatus including the motion vector encoding apparatus shown in FIG. 1 according to a preferred embodiment of the present invention. Referring to FIG. 2, the image data coding apparatus of the type incorporating a multiple-reference method comprises a coding controller 100, a first source encoder 200, and a second source encoder 700. Further, the image data coding apparatus comprises a source decoder 300, a memory 400, a motion compensator 500, and a motion predictor 600.

Figure 3:
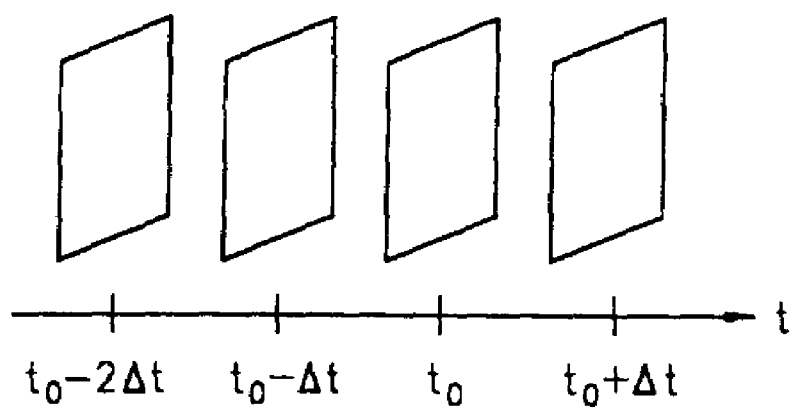
FIG. 3 illustrates an example of input image data.

Input image data is comprised of frames provided from a camera along a time axis as shown in FIG. 3, or blocks obtained by dividing the frames to have predetermined sizes. Each frame may be a progressive scanned frame obtained through progressive scanning, or an interlaced scanned field or frame obtained through interlaced scanning. Therefore, the image data described below represents a picture having a format of a progressive scanned frame, an interlaced scanned frame, a field, or a block.

When an image is input, the coding controller 100 determines a coding type, i.e., an intra-coding type or an inter-coding type, based on whether to carry out motion compensation for the input image according to the characteristic of the input image or an operation desired by a user, and outputs a corresponding control signal to a first switch S1. For the motion compensation, the first switch S1 is turned on because a previous or a following input image is needed. If motion compensation is not required, the first switch S1 is turned off because the previous or the following input image is not needed. If the first switch S1 is turned on, differential image data between the input image and the previous image is provided to the first source encoder 200. If the first switch S1 is turned off, the input image data is provided to the first source encoder 200.

The first source encoder 200 quantizes transformation coefficients obtained by transforming the input image data according to a predetermined quantization process, and produces N×M data, which is two-dimensional data comprised of the quantized transformation coefficients. An example of transformation used is discrete cosine transformation (DCT). The quantization is performed according to predetermined quantization steps or wavelet transformation.

The input image data received by and coded through the first source encoder 200 can be used as reference data for motion compensation of a following or a previous input image data. Therefore, such coded input image data is inverse-quantized and inverse-transformed through the first source decoder 300 which processes data inversely to the first source encoder 200 and, then, stored in the memory 400. If the data output from the first source decoder 300 is differential image data, the coding controller 100 turns on a second switch S2 so that the differential image data is added to an output of the motion compensator 500 and, then, stored in the memory 400.

The motion predictor 600 compares the input image data with the data stored in the memory 400, and searches data mostly approximate to the input image data provided at present. After comparing the searched data with the input image data provided at present, the motion predictor 600 outputs a motion vector (MV). The motion vector is obtained with reference to at least one picture. In other words, the motion vector can be produced with reference to a plurality of previous and/or following pictures. When the motion vector is provided to the memory 400, the memory 400 outputs corresponding data to the motion compensator 500. Based on the data provided from the memory 400, the motion compensator 500 produces a compensation value corresponding to the presently coded image data.

The second source encoder 700 receives the quantized transformation coefficients from the first source encoder 200 and information on the motion vector from the motion predictor 600, and encodes and outputs coding type information, quantization information, and other information required for decoding, which is received from the coding controller 100, and ultimately outputs a bit stream.

The motion vector encoding apparatus 70 according to the present invention is included in the second source encoder 700. Therefore, a method for encoding motion vectors according to the present invention is implemented by the second source encoder 700. As in the MPEG-4 coding standard or the H.263 coding standard, the source encoder 700 implements prediction coding using motion vectors of neighbor blocks so that the relationship between the motion vectors of the neighbor blocks can be reflected and coding efficiency can be improved, rather than directly coding the motion vector of the present block itself.

Figure 4:
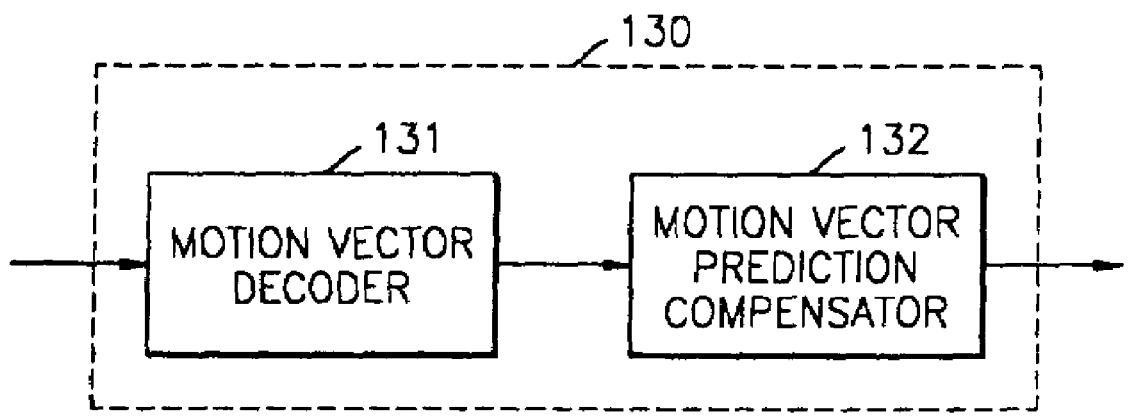
FIG. 4 is a block diagram of a motion vector decoding apparatus according to a preferred embodiment of the present invention.

FIG. 4 is a block diagram of a motion vector decoding apparatus according to a preferred embodiment of the present invention. Referring to FIG. 4, the motion vector decoding apparatus 130 comprises a motion vector decoder 131 and a motion vector prediction compensator 132. The motion vector decoder 131 receives and decodes an encoded motion vector difference value to reconstruct the difference value. In order to obtain an original motion vector from the reconstructed difference value, a predictive value that has been used in calculation of the difference value should be obtained and, then, added to the difference value. For this purpose, the motion vector prediction compensator 132 estimates motion vectors of a type identical to that of a present block and produces predictive motion vectors with respect to neighbor blocks having motion vectors of a type different from that of the present block among a plurality of neighbor blocks adjacent to the present block, and calculates a representative value of the motion vectors of the type identical to that of the present block from the motion vectors of the neighbor blocks and the predictive motion vectors and, then, calculates the motion vector of the present block by adding the calculated representative value of the difference value reconstructed by the motion vector decoder 131.

A method for decoding motion vectors according to the present invention is implemented by the motion vector decoding apparatus 130. As in the MPEG-4 coding standard or the H.263 coding standard, the motion vector decoding apparatus 130 implements prediction decoding using motion vectors of neighbor blocks so that the relationship between the motion vectors of the neighbor blocks can be reflected and coding efficiency can be improved, rather than directly decoding the motion vector of the present block itself.

Figure 5:
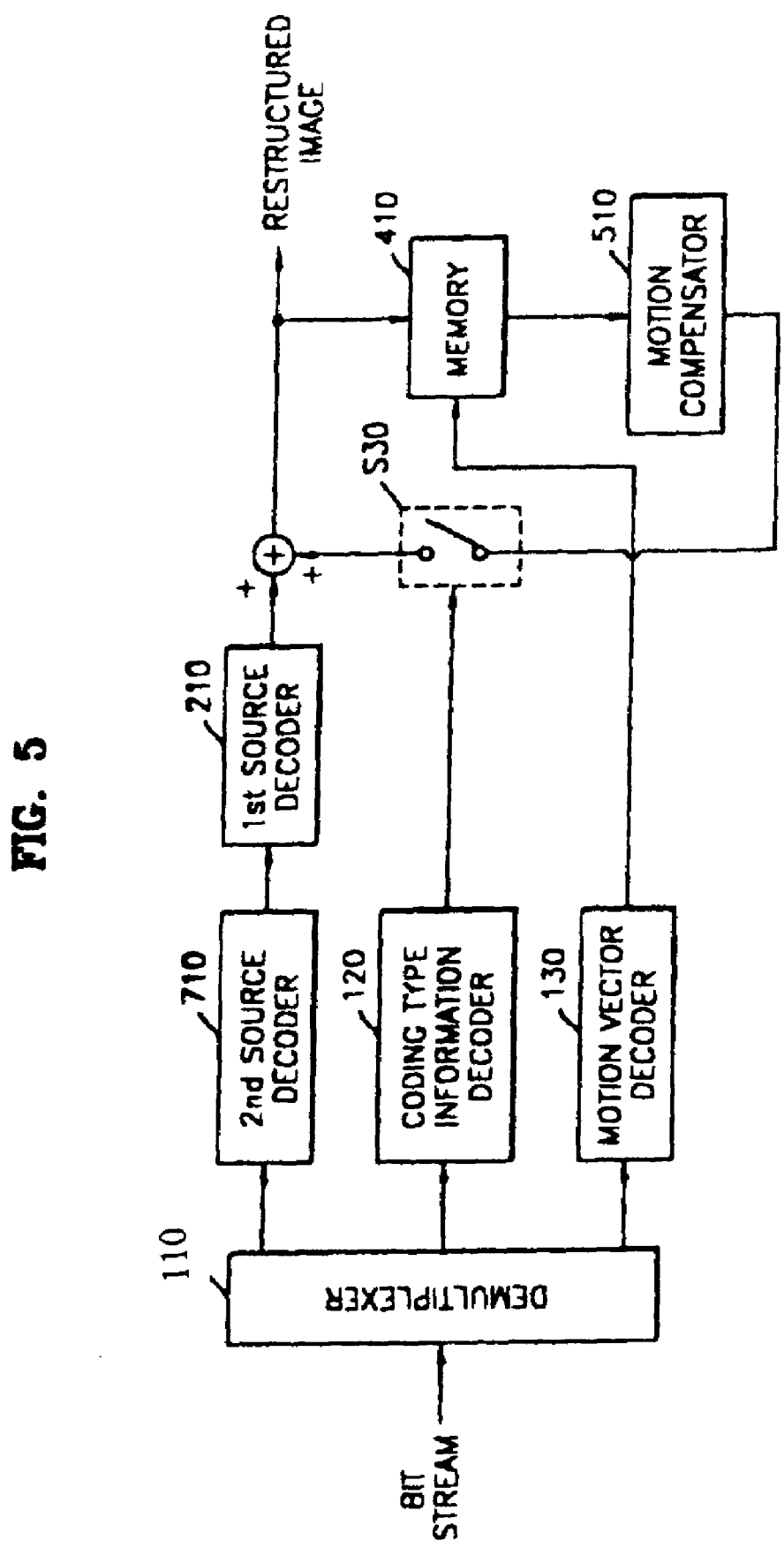
FIG. 5 is a block diagram of an image data decoding apparatus including the motion vector decoding apparatus shown in FIG. 4 according to a preferred embodiment of the present invention.

FIG. 5 is a block diagram of an image data decoding apparatus including the motion vector decoding apparatus shown in FIG. 4 according to a preferred embodiment of the present invention. Referring to FIG. 5, the image data decoding apparatus comprises a demultiplexer 110 for demultiplexing a bit stream, a second source decoder 710, and a first source decoder 210. Further, the image data decoding apparatus comprises a coding type information decoder 120 for decoding coding-type information, and a motion vector decoder 130 for decoding motion vectors according to the present invention.

The demultiplexer 110 demultiplexes the bit stream into entropy-coded and quantized transformation coefficients, motion vector information, coding type information, etc. The second source decoder 710 entropy-decodes the coded transformation coefficients and outputs quantized transformation coefficients. The first source decoder 210 source-decodes the quantized transformation coefficients. That is, the first source decoder 210 processes data inversely to the first source encoder 200. For example, if the first source encoder 200 performs discrete cosine transformation (DCT), the first source decoder 210 performs inverse discrete cosine transformation (IDCT). Consequently, the image data is reconstructed. The reconstructed image data is stored in a memory 410 for motion compensation.

The coding type information decoder 120 discriminates the coding type. If the coding type is an inter type that requires motion compensation, the coding type information decoder 120 turns on a third switch S30 so that a motion compensation value provided from a motion compensator 510 is added to the data provided from the first source decoder 210 to produce the recovered image data. The motion vector decoder 130 indicates a location directed by the motion vector obtained from the motion vector information, and the motion compensator 510 produces a motion compensation value from the reference image data directed by the motion vector. The motion vector encoder 130 is identical, in its operation and structure, to the motion vector decoding apparatus 130 shown in FIG. 4 and, therefore, a detailed description thereof is omitted.

Figure 6:
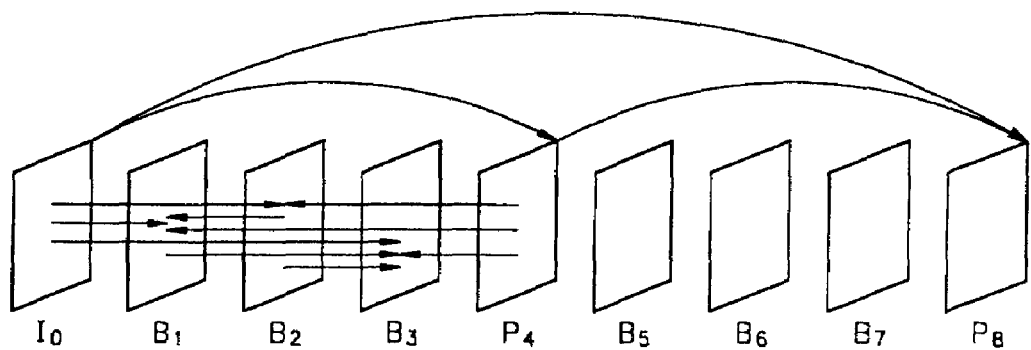
FIG. 6 illustrates a multiple-reference method according to a preferred embodiment of the present invention.

FIG. 6 illustrates a multiple-reference method according to a preferred embodiment of the present invention. Referring to FIG. 6, a picture $I_0$ is an intra picture that is obtained without reference to other pictures, pictures $B_1$, $B_2$, et al. are bi-predictive pictures that are obtained with reference to two different pictures, and pictures $P_4$, $P_8$, et al. are predictive pictures that are obtained with reference to the intra picture only. Arrows indicate dependency of the pictures required for decoding. Specifically, picture $B_2$ is dependent on pictures $I_0$ and $P_4$, picture $B_1$ is dependent on pictures $I_0$, $P_4$ and $B_2$, and picture $B_3$ is dependent on pictures $I_0$, $P_4$, $B_1$ and $B_2$. Therefore, while the order of display is $I_0$, $B_1$, $B_2$, $B_3$, $P_4$, and so on, the order of transmission becomes $I_0$, $P_4$, $B_2$, $B_1$, $B_3$, et al. As described above, the motion vector encoding apparatus shown in FIG. 1 produces bi-predictive pictures that are obtained with reference to a plurality of pictures. In other words, motion vectors in the encoding and decoding method according to the present invention are produced in at least one mode including a bi-predictive mode among forward predictive, backward predictive, bi-directional predictive, and direct predictive modes. In the bi-predictive mode, the two different reference pictures are both previous pictures or both following pictures.

Figure 7:
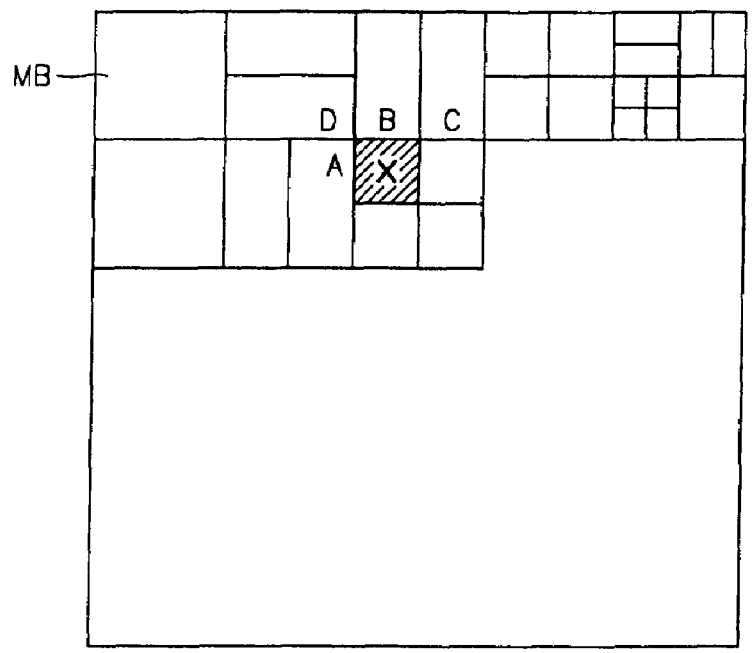
FIG. 7 illustrates motion compensation blocks that constitute units of motion compensation according to a preferred embodiment of the present invention.

FIG. 7 illustrates motion compensation blocks that constitute units of motion compensation according to a preferred embodiment of the present invention. Referring to FIG. 7, a picture is comprised of a plurality of motion compensation blocks. The motion compensation blocks include a 16×16 macro block (MB) according to an embodiment of the present invention as well as a 16×8 block to be obtained by horizontally dividing the 16×16 macro block, an 8×16 block to be obtained by vertically dividing the 16×16 macro block, an 8×8 block to be obtained by horizontally and vertically dividing the 16×16 macro block, an 8×4 or 4×8 block to be obtained by horizontally or vertically dividing again the 8×8 block, and a 4×4 block to be obtained by horizontally and vertically dividing again the 8×8 block.

The motion vector encoding method according to the present invention uses differential pulse code modulation, which encodes a difference value between a representative value of neighbor blocks adjacent to the present block, e.g., a median value in a preferred embodiment of the present invention, and a motion vector MV_X of the present block. Specifically, if the motion vectors of a left block A, an upper block B, and an upper-right block C, which are neighbor blocks adjacent to the present block X, are defined as MV_A, MV_B, and MV_C, respectively, a predictive motion vector PMV_X, which is a predictive value for encoding a differential vector and the differential vector DMV_X, which is a differential value using the predictive value, are calculated according to the following equation:

$$PMV\_X = median(MV\_A, MV\_B, MV\_C)$$

$$DMV\_X = MV\_X - PMV\_X \qquad (1)$$

The calculation is made on each of the component values, i.e. the x component and the y component values, independently. Meanwhile, the left block A is a block including a pixel which is adjacent to and to the left of the left-most pixel in a first row of the present block X, the upper block B is a block including a pixel which is adjacent to and above the left-most pixel in the first row of the present block X, and the upper-right block C is a block including a pixel which is adjacent to and to the upper right of the right-most pixel in the first row of the present block X.

The motion vector decoding method according to the present invention follows a decoding method that obtains a motion vector MV_X of the present block by adding a representative value of neighbor blocks to the present block, e.g. a median value in a preferred embodiment of the present invention, and a decoded difference value MVD_X. Specifically, if the motion vectors of a left block A, an upper block B, and an upper-right block C, which are neighbor blocks to the present block X, are defined as MV_A, MV_B, and MV_C, respectively, a predictive motion vector PMV_X, which is a predictive value for decoding, and the motion vector MV_X, which is obtained by adding a decoded difference value MVD_X to the predictive motion vector PMV_X, are calculated according to the following equation:

$$PMV\_X = median(MV\_A, MV\_B, MV\_C)$$

$$MV\_X = DMV\_X + PMV\_X \qquad (2)$$

The calculation is made on each of the component values, i.e. the x component and the y component values, independently.

While there may be exceptional cases in obtaining motion vectors according to the encoding and decoding method as described above, the following logic can be applied to such exceptional cases.

Firstly, in a case where any of neighbor blocks A, B, C, and D is located outside of a picture or slice, the following logic is applied. It is noted that the slice is a minimal unit of a series of data rows having a starting code. The slice has a predetermined length, and is comprised of a macro block. Further, the slice does not exist over several pictures, but in only one picture.

1) If both of the blocks A and D are located outside of the picture or slice, it is regarded that MV_A=MV_D=0 and that the blocks A and D have a different reference picture from that of the present block X.
2) If all of the blocks B, C and D are located outside of the picture or slice, it is regarded that MV_B=MV_C=MV_A and that, in the case of taking a median value, MV_A should be the predictive motion vector PMV_X of the present block X.
3) If the block C is located outside of the picture or slice, the block C is replaced with the block D. The block D is above and to the left of the present block X, which includes a pixel that is adjacent to and above the left-most pixel of the first row of the present block X.

Secondly, in a case where the neighbor blocks are intra-coded, i.e. if there is an intra-coded block among the neighbor blocks A, B, C, and D, it is regarded that the motion vector of the intra-coded block is zero and has a different reference picture.

Thirdly, in a case where the neighbor blocks have a different reference picture from that of the present block, a predictive motion vector is obtained according to the method of the present invention and, then, the predictive motion vector is used in obtaining a median value. In other words, if the present block and the neighbor blocks participating in the prediction coding have different types of motion vectors, a predictive motion vector of an identical type to that of the present block is obtained according to the method of the present invention and, then, a median value is obtained by substituting the predictive motion vector in the equations (1) and (2) described above.

Figure 8:
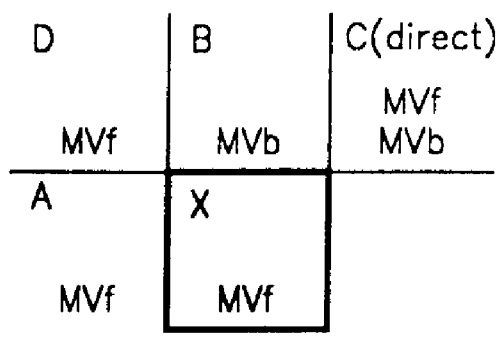
FIG. 8 illustrates a method for obtaining a predictive motion vector according to a preferred embodiment of the present invention.

FIG. 8 illustrates a method for obtaining a predictive motion vector according to a preferred embodiment of the present invention. Referring to FIG. 8, the present block X has a forward motion vector MVf_X, and the neighbor blocks A and D have forward motion vectors MVf_A and MVf_D, respectively, of a type identical to that of the present block X. However, the neighbor block B has a backward motion vector MVb_B of a type different from that of the present block X, and the block C includes both a forward motion vector MVf_C and a backward motion vector MVb_C.

A median value according to the equations (1) and (2) should be obtained with respect to motion vectors having an identical type to that of the present block X, because the motion vectors having a different type from that of the present block may cause degradation of encoding and decoding efficiencies, if such different types of motion vectors are involved in the encoding and decoding. In this regard, since the neighbor block B does not have an identical type motion vector to the present block, a predictive motion vector for the neighbor block B should be obtained first. In other words, a forward motion vector of a type identical to the present block X should be predicted first.

Figure 9:
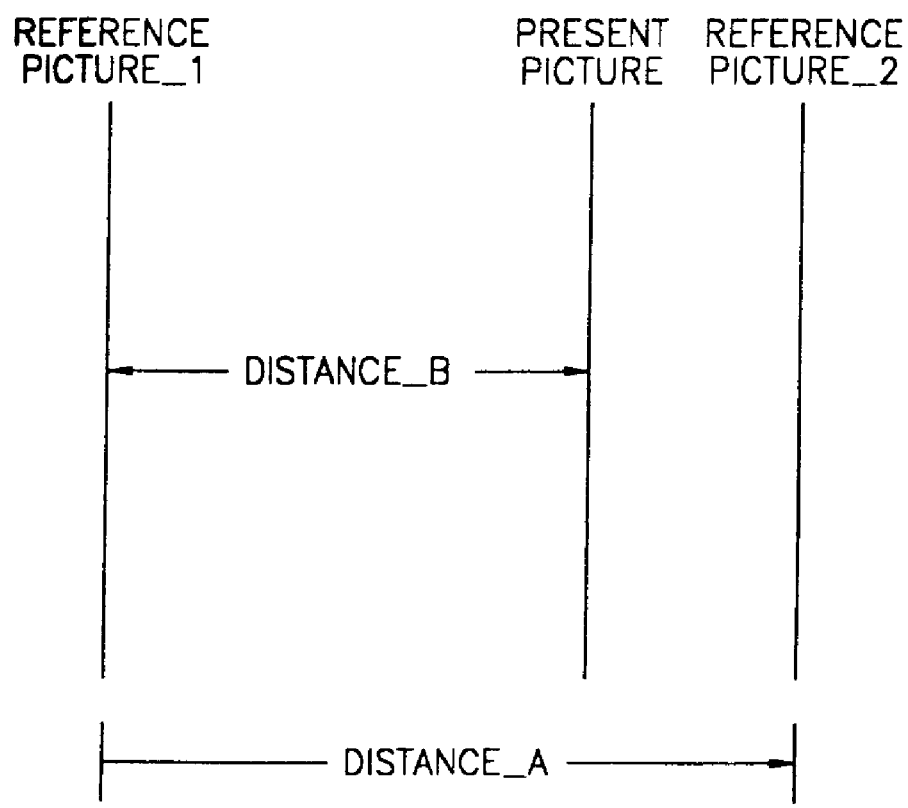
FIG. 9 illustrates a method for obtaining a predictive motion vector.

FIG. 9 illustrates a method for obtaining a predictive motion vector. Referring to FIG. 9, a predictive forward motion vector MVf(predictive) or a predictive backward motion vector MVb(predictive) as a predictive motion vector of a neighbor block can be obtained from the following equation:

$$MVb(\text{predictive}) = \frac{(\text{DISTANCE\_B} - \text{DISTANCE\_A})}{\text{DISTANCE\_B}} \times MVf \quad (3)$$

$$MVf(\text{predictive}) = \frac{\text{DISTANCE\_B}}{(\text{DISTANCE\_B} - \text{DISTANCE\_A})} \times MVb$$

where DISTANCE_A is a distance between reference pictures 1 and 2 referred to by the present picture including a corresponding neighbor block, and DISTANCE_B is a distance between the present picture including a corresponding neighbor block and reference picture 1. In the embodiment of the present invention, reference picture 1 is a previous picture to the present picture, and reference picture 2 is a following picture.

Figure 10:
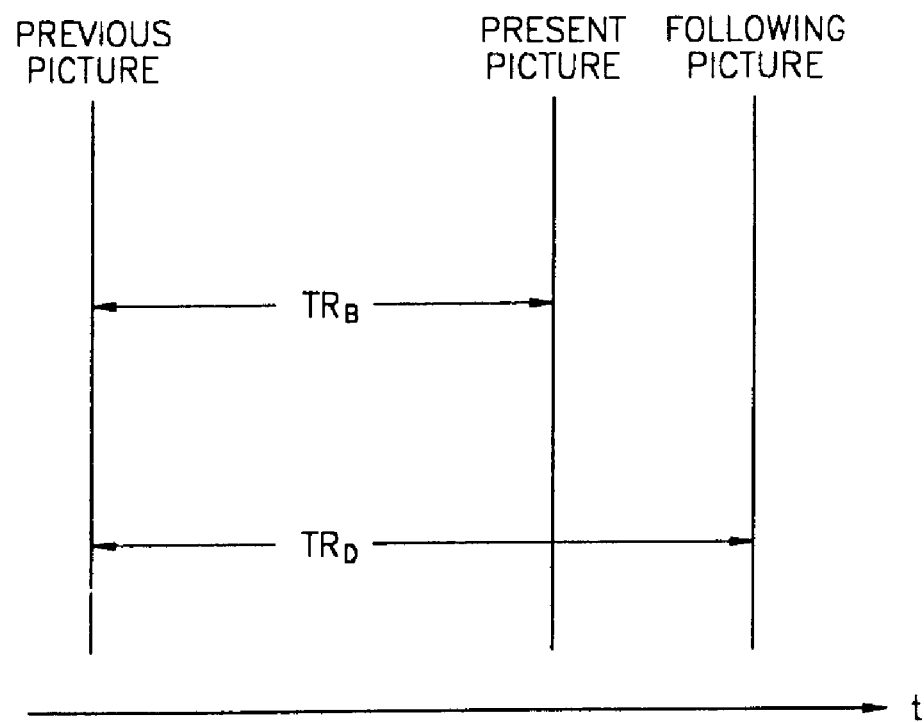
FIG. 10 illustrates another method for obtaining a predictive motion vector.

FIG. 10 illustrates another method for obtaining a predictive motion vector. Referring to FIG. 10, a predictive forward motion vector MVf(predictive) or a predictive backward motion vector MVb(predictive) as a predictive motion vector of a neighbor block can be obtained from the following equation:

$$MVb(\text{predictive}) = \frac{(\text{TR\_B} - \text{TR\_A})}{\text{TR\_B}} \times MVf \quad (4)$$

$$MVf(\text{predictive}) = \frac{\text{TR\_B}}{(\text{TR\_B} - \text{TR\_A})} \times MVb$$

where TR_A is a time difference between reference pictures 1 and 2 referred to by the present picture including a corresponding neighbor block, and TR_B is a time difference between the present picture including a corresponding neighbor block and the reference picture 1. The time difference can be obtained from counter values TR, i.e. temporal references for indicating the order in which the pictures are displayed.

Meanwhile, the motion vector encoding method according to the present invention is particularly efficient for bi-predictive pictures. Further descriptions regarding the bi-predictive pictures are provided below.

The bi-predictive picture does not have a limitation where motion compensation must be carried out using previous and following pictures in terms of time. Therefore, a motion vector of a present block included in the bi-predictive picture is independent in terms of time or direction. In other words, since the bi-predictive picture is obtained with reference to a plurality of pictures, it is most likely that the present block and the neighbor blocks have different types of motion vectors. Nevertheless, the motion vector of the present block included in the bi-predictive picture can be encoded and decoded according to the encoding and decoding method of the present invention regardless of the type of motion vectors of the neighbor blocks.

Since the bi-predictive picture has four motion compensation modes, there are four motion vectors including a forward motion vector MVf, a backward motion vector MVb, a bi-predictive motion vector MVf and MVb, and a direct motion vector. While there is no need to encode or decode the direct motion vector since there is no need to transmit motion vector information to a transmitter stage, the remaining motion vectors must be encoded and decoded using a predictive motion vector PMV obtained from the motion vectors of the neighbor blocks as for a predictive picture.

Since the motion vector of the present block included in the bi-predictive picture is independent in terms of time or direction as described above, whether the motion vector of the present block is forward or backward is not necessarily classified in a certain time or direction. Further, it is not necessary for the bi-predictive motion vector to be classified in a certain time or direction and to include previous and following components based upon a certain time or a certain location.

In order to obtain a predictive motion vector PMV, MVf and MVb utilize a motion vector of an identical type to those of neighbor blocks. In other words, MVf utilizes neighbor MVf's only in obtaining a predictive motion vector, and MVb utilizes peripheral MVf's only. However, since a bi-predictive motion vector includes both MVf and MVb, MVf and MVb of the bi-predictive motion vector utilize corresponding types of motion vectors. Accordingly, when a predictive motion vector PMV must be obtained for encoding or decoding motion vectors of a bi-predictive picture, the motion vectors having the identical type can be predicted according to the method as described with reference to FIGS. 9 and 10 in a case where the type of the motion vectors of neighbor blocks are different.

Referring again to FIG. 7, when MVf_X=(1, 2), MVf_A=(4, 2), MVb_B=(−1, −1), MVf_C=(0, 3), and MVb_C=(−1, −2), MVb_B=(−1, −1) must be excluded and (0, 0) is substituted therewith to obtain a median value according to a conventional method, since MVb_B is a different type of motion vector from the present block. Therefore, the median value becomes (0, 3), and a differential value DMV_X becomes (1, −1). However, according to the present invention, a predictive value (1, 1) is used instead of MVb_B=(−1, −1). Therefore, the median value becomes (1, 1), and the differential value DMV_X becomes (0, 1).

Meanwhile, a motion compensation block may have a rectangular shape. Since a direction of a motion vector can be predicted in a case of such a rectangular type motion compensation block, the predictive motion vector must be obtained in a method different from that of using a median value of the motion vectors of three neighbor blocks as a predictive motion vector.

Figure 11:
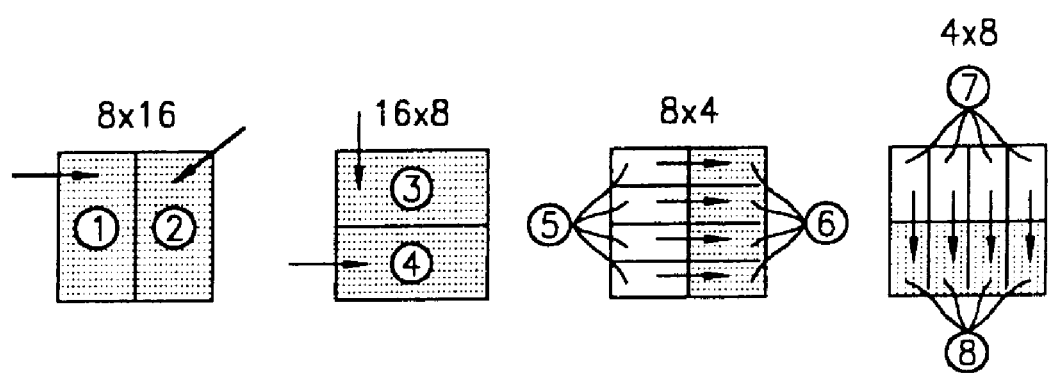
FIG. 11 illustrates a method for obtaining a predictive motion vector with respect to a rectangular motion compensation block.

FIG. 11 illustrates a method for obtaining a predictive motion vector with respect to a rectangular motion compensation block. Referring to FIG. 11, in a case where a motion compensation block is an 8×16 block, a motion vector of a left neighbor block is used as a predictive motion vector of block ①, and a motion vector of an upper-right neighbor block is used as a predictive motion vector of block ②.

In a case where the motion compensation block is a 16×8 block, a motion vector of an upper neighbor block is used as a predictive motion vector of block ③, and a motion vector of a left neighbor block is used as a predictive motion vector of block ④.

In a case where the motion compensation block is an 8×4 block, a predictive motion vector of block ⑤ is obtained using a median value of previous blocks, and a motion vector of a left neighbor block is used as a predictive motion vector of block ⑥.

In a case where the motion compensation block is a 4×8 block, a predictive motion vector of block ⑦ is obtained using a median value of previous blocks, and a motion vector of an upper neighbor block is used as a predictive motion vector of block ⑧.

However, if a reference picture of the motion vector determined as a predictive motion vector is different from that of the present block, the existing median value is used. In other exceptional cases, prediction of a median value as described above is applied.

The above described encoding method and decoding method can be incorporated into a computer program. A computer programmer in the field of the present invention may easily deduce codes or code segments to constitute the computer program. Further, the program can be stored in a computer readable information-recording medium, and can be read and implemented to realize the coding method and decoding method. The computer readable information-recording medium includes magnetic recording media, optical recording media, and carrier wave media.

As described above, according to the present invention, the motion vectors are encoded and decoded by predicting motion vectors of a type identical to that of a present block with respect to neighbor blocks having motion vectors of a type different from that of the present block; obtaining a median value based upon the prediction; encoding a differential value obtained on the basis of the median value; and obtaining a motion vector of the present block by adding the decoded differential value and the median value that is obtained on the basis of prediction of motion vectors of a type identical to that of a present block with respect to neighbor blocks having motion vectors of a type different from that of the present block. Consequently, encoding and decoding efficiencies can be improved.

In other words, using a representative value, i.e. a median value in a preferred embodiment of the present invention, of the motion vectors of neighbor blocks in encoding and decoding a motion vector of the present block is based upon a presumption that the motions of the neighbor blocks are similar. Therefore, according to the encoding and decoding method of the present invention, a conventional problem of excluding the motion vectors of the neighbor blocks referring to the different reference picture from the prediction coding process and insufficiently reflecting the relationship between the motion vectors of the neighbor blocks can be solved. Further, encoding and decoding efficiencies can be improved even when the motion vectors refer to different reference pictures by obtaining a predictive motion vector of an identical type and reflecting the predictive motion vector for obtaining a representative value, e.g. a median value.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A method for decoding motion vectors comprising:
   selecting a neighbor block having a motion vector used to obtain a predictive motion vector of a present block included in a macroblock according to a size and a location of the present block; and
   determining the motion vector of the neighbor block as a predictive motion vector of present block,
   wherein, if the present block is 8×16 and located in a right side of the macroblock, the motion vector of the neighbor block located in an upper-right side of the present block is determined as the predictive motion vector of present block.

2. The decoding method according to claim 1, further comprising:
   reconstructing a difference value between an original motion vector and the predictive motion vector of the present block; and
   adding the difference value to the predictive motion vector of the present block.

3. An apparatus for decoding motion vectors comprising:
   a motion vector decoder for decoding a difference value; and
   a motion vector prediction compensator which selects a neighbor block having a motion vector used to obtain a predictive motion vector of a present block included in a macroblock according to a size and a location of the present block, determines the motion vector of the neighbor block as a predictive motion vector of present block and calculates the motion vector of the present block by adding the determined predictive motion vector and the decoded difference value,
   wherein, if the present block is 8×16 and located in a right side of the macroblock, the motion vector of the neighbor block located in an upper-right side of the present block is selected as the predictive motion vector of present block.

* * * * *